United States Patent [19]

Vydra et al.

[11] 4,016,248
[45] Apr. 5, 1977

[54] PROCESS FOR THE CATALYTIC CONVERSION OF $SO_2$ TO $SO_3$

[75] Inventors: Karel Vydra; Zdenek Hubalek, both of Bad Nauheim, Germany

[73] Assignee: Metallgesellschaft Aktiengesellschaft, Frankfurt am Main, Germany

[22] Filed: Feb. 27, 1976

[21] Appl. No.: 662,168

Related U.S. Application Data

[63] Continuation of Ser. No. 443,916, Feb. 19, 1974, abandoned.

[30] Foreign Application Priority Data

Feb. 17, 1973 Germany ............................ 2307973

[52] U.S. Cl. .............................. 423/533; 423/522
[51] Int. Cl.² ................. C01B 17/68; C01B 17/76
[58] Field of Search .......... 423/522, 532, 533, 534, 423/535, 538, 536, 537

[56] References Cited

UNITED STATES PATENTS

| | | |
|---|---|---|
| 3,005,687 | 10/1961 | Uby ................................. 423/522 |
| 3,147,074 | 9/1964 | Maurer .............................. 423/522 |
| 3,350,169 | 10/1967 | Fenckhoff .......................... 423/538 |
| 3,404,955 | 10/1968 | Drechsel et al. ................... 423/522 |
| 3,443,896 | 5/1969 | Furkert et al. ..................... 423/522 |
| 3,671,194 | 6/1972 | Roberts ............................. 423/522 |
| 3,803,297 | 4/1974 | Suth et al. ......................... 423/522 |

*Primary Examiner*—Oscar R. Vertiz
*Assistant Examiner*—Gary P. Straub
*Attorney, Agent, or Firm*—Karl F. Ross; Herbert Dubno

[57] ABSTRACT

A process for the catalytic conversion of $SO_2$ to $SO_3$ wherein a main stream of $SO_2$-containing gas is branched to form a partial stream which is admixed with an oxygen-containing gas and brought to the temperature of the first contact hurdle or stage. The effluent therefrom is mixed with the remainder of the $SO_2$-containing gas and is fed to the second contact hurdle or stage. The oxgyen-containing gas is added in an amount sufficient to reduce the $SO_2$ concentration so that a temperature can be used in the first stage which corresponds to the $SO_2 + \frac{1}{2} O_2 \rightarrow SO_3$ equilibrium.

2 Claims, 2 Drawing Figures

PROCESS FOR THE CATALYTIC CONVERSION OF $SO_2$ TO $SO_3$

This is a continuation of application Ser. No. 443,916, filed Feb. 19, 1974, now abandoned.

FIELD OF THE INVENTION

The present invention relates to a process for the catalytic conversion of $SO_2$ to $SO_3$ and, more particularly, to improvement in a process for such catalytic conversion which avoids deterioration of temperature-sensitive catalysis.

BACKGROUND OF THE INVENTION

In the production of sulfuric acid and oleum, it is a common practice to subject a gas stream containing $SO_2$ and oxygen to catalytic reaction on a succession of contact-catalyst hurdles, thereby producing $SO_3$ which can be absorbed in water or sulfuric acid.

In the transformation of $SO_2$ containing gases to $SO_3$ in, for example, sulfuric acid manufacturing processes, it is known that the catalyst must be operated at a temperature above the so-called starting or threshold temperature for effective conversion. At temperatures below this critical starting temperature, the conversion does not proceed to any significant degree. In the case of vanadium pentoxide ($V_2O_5$) catalysts, depending upon the composition and the method of production, the starting or threshold temperature is between 400° and 450° C.

Since the conversion of $SO_2$ to $SO_3$ is an exothermic reaction, the heat evolved during the reaction frequently raises the temperature of the catalyst bed. For example, with gases having an $SO_2$ concentration up to about 11%, the temperature can rise to 620° C, a temperature at which the equilibrium condition $SO_2 + \frac{1}{2}O_2 \rightleftarrows SO_3$ is achieved. With so high a concentration, the temperature may rise above the equilibrium temperature in which case the reverse reaction dominates, i.e. the equilibrium favors high $SO_2$ and low $SO_3$ concentrations in the equilibrium mixture. As a consequence, operations above the $SO_2 + \frac{1}{2}O_2 \rightleftarrows SO_3$ equilibrium are undesirable. Furthermore, at temperatures above about 620° C, the catalyst is endangered. Catalysts which have an upper temperature limit at which they remain effective and which have a tendency to lose potency above a critical temperature level are referred to hereinafter as temperature-sensitive catalysts.

It has long been recognized in the art that it is important, because of the temperature sensitivity of the catalyst, to prevent overheating of the catalyst in $SO_2$ conversion systems.

Thus it is known to lower the $SO_2$ concentration of the gas by withdrawing from the first contact catalyst stage the gas which has been partially transformed to $SO_3$ and to recirculate it to the incoming gas. Of course, where a portion of the gas is continuously recirculated and all of the incoming gas plus the recycled portion must be passed through the first contact stage, a large volume of gas must be processed, especially since the recirculated quantity of gas must also be large to bring about the desired reduction in $SO_2$ concentrations. In fact, this latter volume must be increased with higher $SO_2$ concentrations and as a result the processing equipment must be of corresponding volumetric capacity.

It has also been proposed to mix with the $SO_2$-containing incoming gases, $SO_3$-containing air as is derived from the formation of oleum (i.e. the blowing out thereof). This technique is only practiced where oleum is to be produced and also increases the volume of gases which must traverse the contact vessels.

Gases with an $SO_2$ content up to 14% and with an oxygen deficiency can be treated in stages and completed in stages by blowing dry cold air into the gas to increase the oxygen content and to cool the gas. This process, where oxygen is admitted between successive stages, has the disadvantage that uniform mixing of the gases with air requires expensive apparatus and complex control means. For example, the vessel cross-section must increase proportionally to the gas volume from stage to stage.

In still another prior art technique, gases with an $SO_2$ content of about 8 to 11% are passed through a main contact vessel at a velocity of 0.6 to 2 meters per second while a branch stream is subjected to precontact so that an $SO_3$-containing effluent is formed which is returned to the main gas stream before it enters the main contact vessel. The transformation of the branch stream in the precontact stage takes place well below the $SO_2 + \frac{1}{2} O_2 \rightleftarrows SO_3$ equilibrium even with relatively low $SO_2$ levels. In fact, it has proved to be impossible to obtain an equilibrium condition with $SO_2$ concentrations above 11% in a system using a precontact stage as described.

It should also be mentioned that studies have been made on controlling the temperature maximum for the transformation of $SO_2$ containing gases in a hurdle contact system and techniques have been described which require a large number of contact hurdles with high pressure drops and power losses through the system.

OBJECT OF THE INVENTION

It is, therefore, the principal object of the present invention to provide a process for the catalytic conversion of $SO_2$ to $SO_3$ whereby the aforementioned disadvantages are obviated.

It is another object of the invention to provide a process for the catalytic transformation of $SO_2$ to $SO_3$ without detriment to a temperature sensitive catalyst, such as a vanadium pentoxide catalyst as described above.

Still another object of the invention is to obviate the disadvantages of conventional processes by avoiding damage to the contact mass without increasing materially the gas volume which must be processed and in a manner which permits simple control of the throughput and is effective even with gases of high $SO_2$ concentration.

SUMMARY OF THE INVENTION

These objects and others which will become apparent hereinafter are attained, in accordance with the present invention, in a process for converting sulfur dioxide to sulfur trioxide by contact catalysis and wherein a partial stream of $SO_2$ containing gas is branched from a main stream thereof, the partial stream of $SO_2$ containing gas is brought to the operating temperature of a first contact catalysis stage and the $SO_2$ in this branch stream is partially transformed to $SO_3$ in contact with a temperature-sensitive catalyst and at the operating temperature of the first stage, the branch stream of $SO_2$-containing gas (now partially transformed to $SO_3$)

is admixed with the remainder of the main stream, and the resulting mixture is brought to the operating temperature of and is fed to the second contact catalysis stage.

The present improvement comprises maintaining the temperature in the first stage at a level substantially corresponding to that of the $SO_2 + \frac{1}{2} O_2 \rightleftarrows SO_3$ equilibrium, and adding oxygen-containing gas to the partial stream admitted to the first stage to reduce the concentration of $SO_2$ therein so that the temperature level of the equilibrium lies below the temperature at which the catalyst is damaged.

In other words the present invention provides that the $SO_2$ content of the partial stream of $SO_2$ containing gas, before its entry into the first contact hurdle, is mixed with oxygen containing gas to reduce the construction of the mixture introduced into the first contact hurdle below the concentration which is detrimental to the catalyst, while the transformation of $SO_2$ and $SO_3$ in the first contact hurdle is carried out approximately at the equilibrium condition $SO_2 + \frac{1}{2} O_2 \rightleftarrows SO_3$. The oxygen containing gas is preferably air.

The quantity of oxygen-containing gas admixed with the partial stream of $SO_2$ containing gas must be at least sufficient to lower the $SO_2$ content of the mixture to the point where no damage to the contact mass can occur in the first contact hurdle. The concentration of $SO_2$ in the mixture, above which the catalyst may be endangered, is dependent upon the pressure at which reaction is carried out and the ratio of $SO_2$ to $O_2$ in the gas. With catalysts that operate under normal pressure, i.e. only the pressure at which the gas is fed to the catalyzing reactor, the permissible $SO_2$ content in the mixture admitted to the first contacting hurdle is about 10.5%. Thus when the first stage reaction is carried out under normal pressure the oxygen containing air must be admixed with the partial streams of $SO_2$ containing gas in an amount to reduce the $SO_2$ content in the resulting mixture to a maximum of 10.5%.

With catalysis operating under elevated pressures, the permissible $SO_2$ content is lower. With a pressure of 5 atmosphere gauge, an $SO_2$ content above about 7% may be detrimental to the catalyst. In case of elevated pressure operations, therefore, the oxygen containing gas must be added to the partial streams in sufficient quantities to reduce the $SO_2$ concentration below 10.5%.

The quantity of the partial stream and the main stream of $SO_2$ containing gas is so determined that, when the gases leaving the first contact hurdle are mixed with the remainder of the main gas stream, the $SO_2$ content in the latter is below that at which deterioration of the catalyst in the second contact hurdle will commence when the $SO_2 + \frac{1}{2} O_2 \rightleftarrows SO_3$ equilibrium is brought about therein.

According to another feature of the present invention, the temperature of the partial gas stream admitted to the first contact hurdle is brought to the operating temperature thereof solely by the addition of the oxygen containing gas thereto or partly by such addition. In the first case, no additional heat exchanger is necessary.

In a preferred aspect of the invention, the $SO_2$-containing gas of the main stream, before branching the partial stream therefrom, has an oxygen deficiency from the point of view of the oxygen required for the stoichiometric conversion of the $SO_2$ in the gas to $SO_3$. The oxygen deficiency is supplied by mixing the oxygen-containing gas with the branched partial stream before its entry into the first contact hurdle.

By mixing a large quantity of oxygen-containing gas with the fraction of the $SO_2$ containing gas for introduction into the first contact catalysis stage, it is possible to reduce the cost of cooling or heating of the $SO_2$ containing gas between the apparatus for generating the $SO_2$ containing gas and the contact-catalysis apparatus. When the $SO_2$ containing gas is a cold gas obtained from the roasting of metallurgical ores, or concentrates or metallurgical intermediate, any heating means may be of significantly smaller capacity and size.

According to another preferred aspect of the invention, the temperature of the $SO_2$ containing gas, before the branching of the partial stream therefrom lies above the working temperature of the first contact hurdle and is brought to the operating temperature for the second contact hurdle by passing it through a heat exchanger. The heat exchanger surface may be relatively small.

In practice, we have found that the process can be used effectively for gases which contain up to 66% $SO_2$ by volume and with high concentrations of $SO_2$; the contact hurdles can be provided in cascade. In other words, each preceding contact hurdle can be considered the first contact stage according to the present invention for each succeeding contact hurdle or second stage. Thus a portion of the gas fed from a preceding contact hurdle to the succeeding contact hurdle may be branched therefrom and fed through the next contact hurdle in admixture with the oxygen-containing gases under the principles stated, whereby the balance of the gases from the first contact hurdle and the effluent from the second contact hurdle are combined for admission to a third contact hurdle etc. The system can be operated with or without intermediate absorbers. An intermediate absorber is a system which may be disposed between any two contact hurdles or any pair of successive cascade hurdles for partially or completely removing sulfur trioxide from the gaseous effluent from the hurdle by absorption in sulfuric acid.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
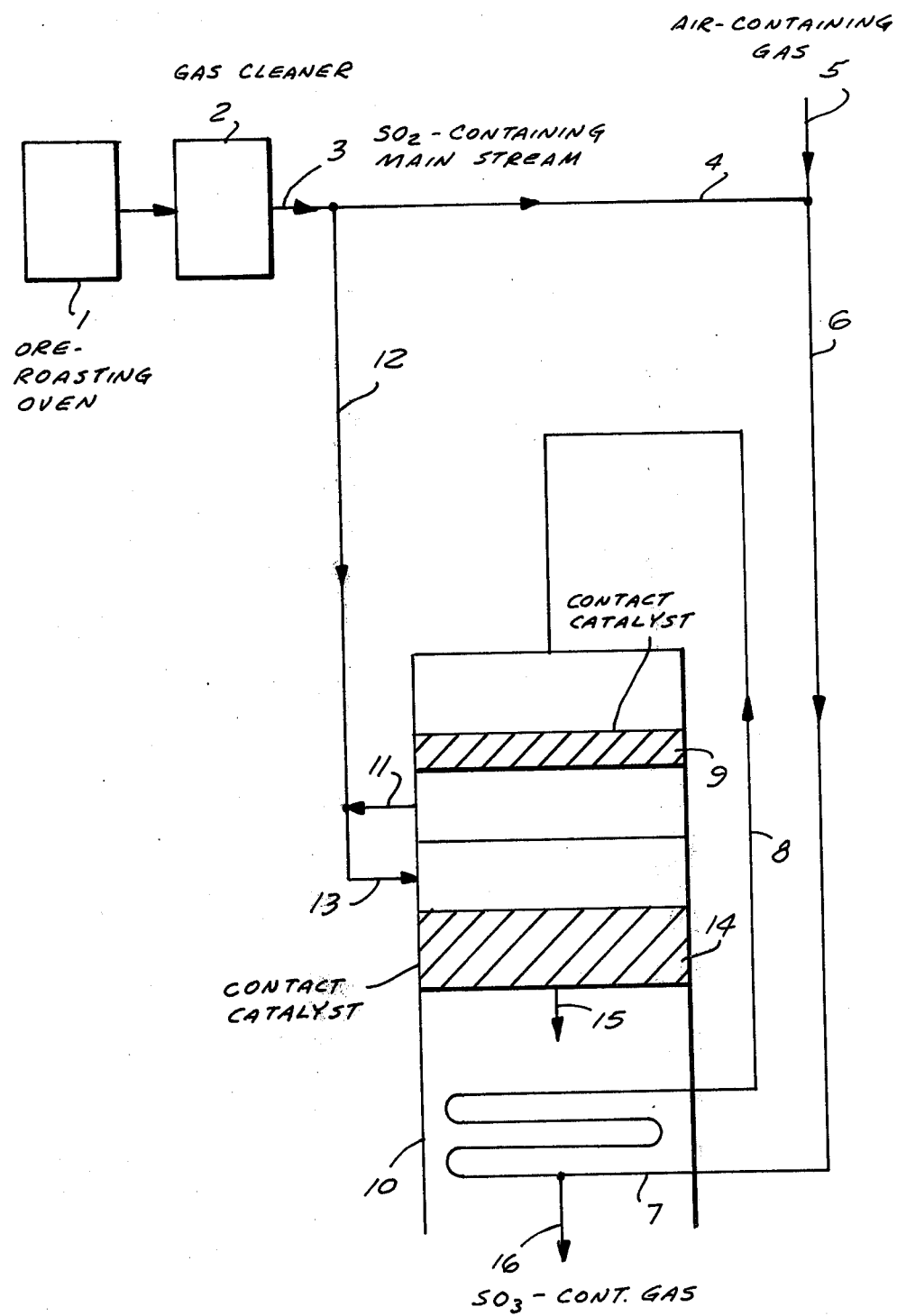
FIG. 1 is a flow diagram illustrating an apparatus for the conversion of roasting gases.

FIG. 1 shows a roasting oven 1 in which sulfide ores are roasted in the presence of oxygen to produce a sulfur-dioxide-containing gas stream which is fed to a gas-cleaning apparatus 2 of the wet or dry type. The clean $SO_2$-containing gas is fed via line 3 from the gas cleaning apparatus and is branched at 4 in a partial stream of $SO_2$-containing gas which is mixed with air supplied at 5, the resulting mixture passing via line 6 into a heat exchanger 7 disposed downstream of a second contact hurdle 14 having a vanadium oxide contact catalyst for the transformation of $SO_2$ to $SO_3$ in the presence of oxygen.

The gas mixture is heated in the heat exchanger 7 and is then led via line 8 to the first contact hurdle of a contact reactor diagrammatically shown at 10.

The gas mixture, in which the sulfur dioxide has been partly converted to sulfur trioxide, is conducted via line 11 out of the first contact stage and is mixed with the remainder of the SO₂-containing gas delivered by line 12, the mixture being fed at 13 through the second contact stage 14.

From the second contact stage 14, transformed gas flows at 15 through the heat exchanger 7 and is cooled at 16 for further use, e.g. passage through an intermediate absorber and then use as the main stream for a further pair of contact hurdles as described previously.

Figure 2:
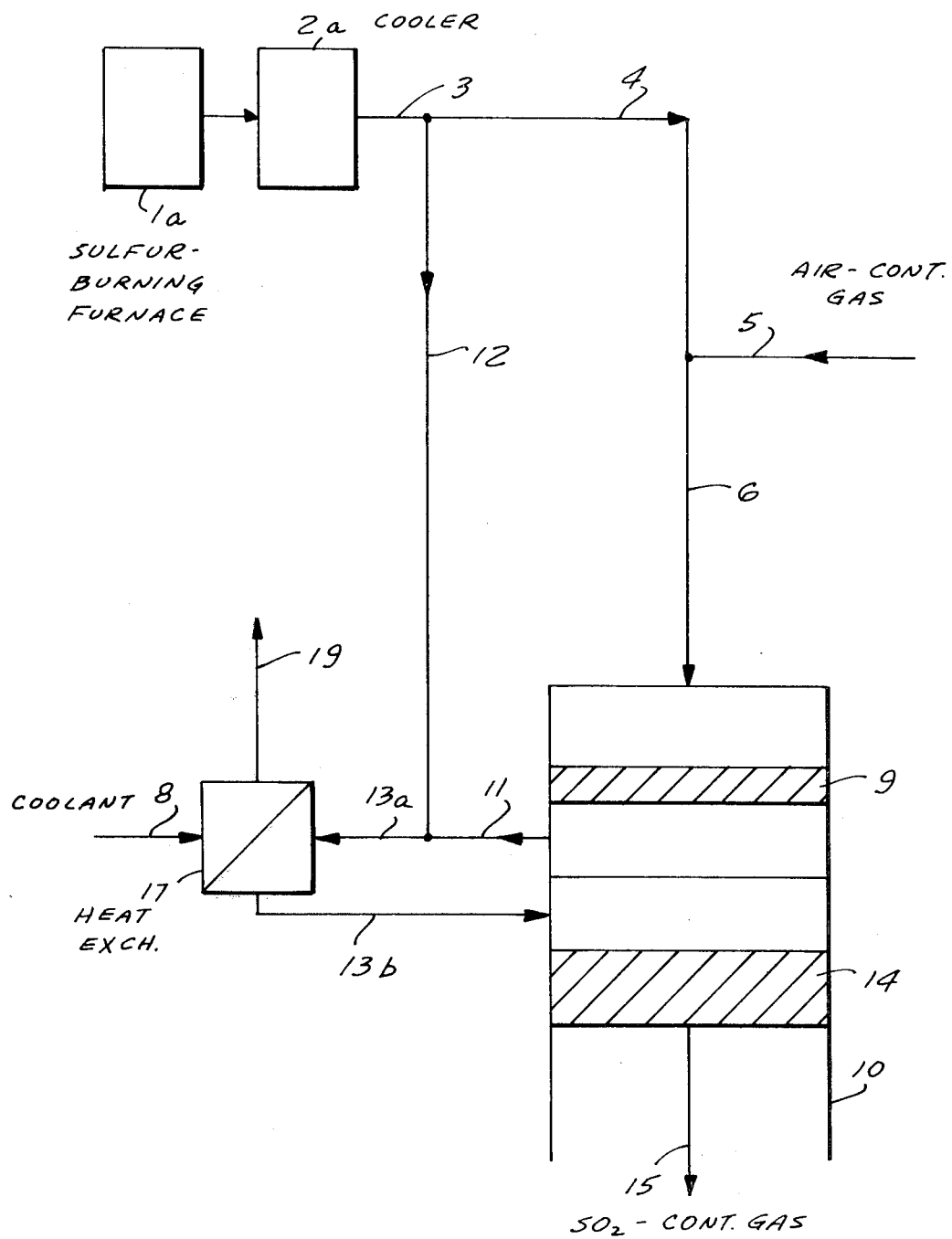
FIG. 2 is a flow diagram of a system for the treatment of the products of a sulfur combustion furnace according to the present invention.

In FIG. 2 a slightly different flow diagram has been shown in which the gas is generated and a sulfuric burning furnace 1a and flows through a waste heat boiler 2a. The branched stream 4 is combined with oxygen delivered at 5 and the mixture is fed at 6 directly to the first contact hurdle or stage 9. The partly reactive gases emerge at 11 from this first stage and are combined with the remainder of the main stream delivered to 12 from line 3 and the combined gas stream is fed through a heat exchanger 17 whose input is represented at 13a. The cool gases are returned at 13b to the second contact stage 14 while a cooling water inlet is provided at 18 and the outlet at 19 for the heat exchanger. The further converted gases at 15 may be treated as previously described.

SPECIFIC EXAMPLES

In the following Examples, reference is made to the monohydrate of sulfur trioxide (sulfuric acid) which may be collected by absorbing the sulfur trioxide or dilute sulfuric acid, for systems with different sulfur dioxide gas contents. The left hand column in each case represents the location in the diagrams of FIGS. 1 and 2, at which the flow measurements are taken and the concentrations of the critical substances and temperatures at these locations are also given. The contact catalyst may be any of the catalysts described in the following publications: U.S. Pat. No. 2,180,727, German Pat. No. 504,635, German Auslegeschrift 1,054,431, German Auslegeschrift 1,066,557, German Auslegeschrift 2,026,818 and German Offenlegungsschrift 1,667,509.

Production of 2000 t Monohydrate per day from sulfur-combustion gases

EXAMPLE 1: SO₂-Content 14% (Vol)

| Location | Quantity Nm³/h | Composition in Vol. % SO₂ | O₂ | SO₃ | Temp. °C |
|---|---|---|---|---|---|
| 3 | 133800 | 14 | 7 | | 558 |
| 12 | 107000 | 14 | 7 | | 558 |
| 4 | 26300 | 14 | 7 | | 558 |
| 5 | 8933 | | 21 | | 50 |
| 6 | 35733 | 10.5 | 10.5 | | 440 |
| 11 | 34657 | 4.62 | 7.72 | 6.21 | 615 |
| 13a | 141657 | 11.7 | 7.18 | 1.52 | 571 |
| 13b | 141657 | 11.7 | 7.18 | 1.52 | 440 |
| 15 | 137440 | 5.93 | 4.33 | 7.7 | 620 |

EXAMPLE 2: SO₂-Content 40% (vol)

| Location | Quantity Nm³/h | Composition in Vol. % SO₂ | O₂ | SO₃ | Temp. °C |
|---|---|---|---|---|---|
| 3 | 46800 | 40 | 30 | | 600 |
| 12 | 26442 | 40 | 30 | | 600 |
| 4 | 20358 | 40 | 30 | | 600 |
| 5 | 81432 | | 21 | | 387 |
| 6 | 101790 | 8 | 22.8 | | 440 |
| 11 | 98799 | 2.19 | 20.46 | 6.05 | 619 |
| 13a | 125241 | 10.17 | 22.48 | 4.78 | 616 |
| 13b | 125241 | 10.17 | 22.48 | 4.78 | 440 |
| 15 | 121368 | 4.11 | 20 | 11.31 | 617 |

EXAMPLE 3: SO₂-Content 62% (Vol)

| Location | Quantity Nm³/h | Composition in Vol. % SO₂ | O₂ | SO₃ | Temp. °C |
|---|---|---|---|---|---|
| 3 | 30100 | 62 | 35 | | 600 |
| 12 | 16555 | 62 | 35 | | 600 |
| 4 | 13545 | 62 | 35 | | 600 |
| 5 | 91428 | | 21 | | 405 |
| 6 | 104973 | 8 | 22.31 | | 440 |
| 11 | 101889 | 2.19 | 20.47 | 6.5 | 619 |
| 13a | 118444 | 10.55 | 22.5 | 5.21 | 616 |
| 13b | 118444 | 10.55 | 22.5 | 5.21 | 440 |
| 15 | 114724 | 4.4 | 19.99 | 11.86 | 620 |

Production of 1000 t Monohydrate per day from Roasting gases

EXAMPLE 4: SO₂-Content 15% (Vol)

| Location | Quantity Nm³/h | Composition in Vol. % SO₂ | O₂ | SO₃ | Temp. °C |
|---|---|---|---|---|---|
| 3 | 62337 | 15 | 8 | | 360 |
| 12 | 49869 | 15 | 8 | | 360 |
| 4 | 12467 | 15 | 8 | | 360 |
| 5 | 8783 | | 21 | | 50 |
| 6 | 21251 | 8.8 | 13.37 | | 239 |
| 8 | 21251 | 8.8 | 13.37 | | 440 |
| 11 | 20627 | 3.02 | 10.75 | 6.05 | 619 |
| 13 | 70497 | 11.49 | 8.81 | 1.77 | 440 |
| 15 | 68348 | 5.57 | 5.94 | 8.11 | 620 |
| 16 | 68348 | 5.57 | 5.94 | 8.11 | 560 |

Production of 1000 t Monohydrate per day from Sulfur-combustion gases under pressure.

EXAMPLE 5: SO₂-Content 12% (Vol)
Pressure 5 atm (g)

| Location | Quantity Nm³/h | Composition in Vol. % SO₂ | O₂ | SO₃ | Temp. °C |
|---|---|---|---|---|---|
| 3 | 77900 | 12 | 9 | | 600 |
| 12 | 57646 | 12 | 9 | | 600 |
| 4 | 20254 | 12 | 9 | | 600 |
| 5 | 14467 | | 21 | | 200 |
| 6 | 34721 | 7 | 14 | | 440 |
| 11 | 33708 | 1.2 | 11.41 | 6.01 | 620 |
| 13a | 91354 | 8.01 | 9.89 | 2.22 | 609 |
| 13b | 91354 | 8.01 | 9.89 | 2.22 | 440 |
| 15 | 88631 | 2.12 | 7.12 | 8.43 | 620 |

The advantages of the present invention reside, inter alia, in that gases with a sulfur dioxide content of up to about 66% can be processed without significant increase in the size of the contact apparatus and without significant increase in the overall gas volume which may be processed. In all of the contact stages, the operation is best carried out at the $SO_2 + \frac{1}{2} O_2 \rightleftarrows SO_3$ equilibrium and this enables careful control of the throughput. The gases emerging from the waste heat boiler of a sulfur-combustion plant can be at a higher temperature, thereby enabling this heat exchange device to be considerably smaller.

We claim:

1. In a process for converting the $SO_2$ content of gases containing $SO_2$ in an amount of 10.5% to 66% by volume to $SO_3$ by contact catalysis wherein:
   a. a partial stream of the $SO_2$-containing gas is branched from a main stream thereof:
   b. the partial stream of $SO_2$-containing gas is brought to an inlet temperature corresponding to at least the initiation temperature of a first contact-catalysis stage and the $SO_2$ in said partial stream is partially oxidized to $SO_3$ in contact with an $SO_2$-oxidation catalyst at the temperature of the $SO_2$-containing gas introduced into said first stage;
   c. the partial stream of $SO_2$-containing gas partially transformed to $SO_3$ is admixed with the remainder of said main stream; and
   d. the mixture of the main and partial streams is brought to the operating temperature of a second contact-catalysis stage to transform $SO_2$ in the mixture to $SO_3$, the improvement which comprises:
   e. mixing air, oxygen or oxygen-enriched air free from $SO_3$ with the partial stream of $SO_2$-containing gas prior to its introduction into the first contact-catalysis stage (b) to reduce the concentration of $SO_2$ in the gas mixture treated in said first contact-catalysis stage below that at which the catalyst thereof is damaged by temperature rise due to the conversion of $SO_2$ to $SO_3$;
   f. treating said mixture in said first stage until the equilibrium condition of said mixture is approximately reached;
   g. the amount of oxygen introduced by said admixture of air, oxygen or oxygen-enriched air free of $SO_3$ being at least the stoichiometric amount necessary for oxidizing an $SO_2$ amount in the gas mixture in step (f) which results in a temperature rise of the gas mixture which is just below the damaging temperature of the catalyst;
   h. the quantities of said partial stream and said main stream being so determined that, when the gases leaving said first stage are mixed with the main stream, the $SO_3$ content in the mixture is sufficient to prevent deterioration of the catalyst in the second stage by treating the mixture in the second stage until the equilibrium condition of the mixture is reached;
   i. treating the gas stream leaving said second stage in subsequent contact-catalysis stages without admixture of $SO_2$-containing gases; and
   j. said main stream (a) being at a higher temperature than the operating temperature of said second stage, said partial stream of $SO_2$-containing gas being cooled to the inlet temperature of said first stage by said mixing with air, oxygen or oxygen-enriched air, and cooling the mixture of the partially transformed gas with the remainder of said main stream in a heat exchanger prior to its introduction into said second stage.

2. In a process for converting the $SO_2$ content of gases containing $SO_2$ to $SO_3$ by contact catalysis wherein:
   a. a partial stream of the $SO_2$-containing gas is branched from a main stream thereof;
   b. the partial stream of $SO_2$-containing gas is brought to an inlet temperature corresponding to at least the initiation temperature of a first contact-catalysis stage and the $SO_2$ in said partial stream is partially oxidized to $SO_3$ in contact with an $SO_2$-oxidation catalyst at the temperature of the $SO_2$-containing gas introduced into said first stage;
   c. the partial stream of $SO_2$-containing gas partially transformed to $SO_3$ is admixed with the remainder of said main stream; and
   d. the mixture of the main and partial streams is brought to the operating temperature of a second contact-catalysis stage to transform $SO_2$ in the mixture to $SO_3$, the improvement which comprises:
   e. mixing air, oxygen or oxygen-enriched air free from $SO_3$ with the partial stream of $SO_2$-containing gas prior to its introduction into the first contact-catalysis stage (b) to reduce the concentration of $SO_2$ in the gas mixture treated in said first contact-catalysis stage below that at which the catalyst thereof is damaged by temperature rise due to the conversion of $SO_2$ to $SO_3$;
   f. treating said mixture in said first stage until the equilibrium condition of said mixture is approximately reached;
   g. the amount of oxygen introduced by said admixture of air, oxygen or oxygen-enriched air free of $SO_3$ being at least the stoichiometric amount necessary for oxidizing an $SO_2$ amount in the gas mixture in step (f) which results in a temperature rise of the gas mixture which is just below the damaging temperature of the catalyst;
   h. the quantities of said partial stream and said main stream being so determined that, when the gases leaving said first stage are mixed with the main stream, the $SO_3$ content in the mixture is sufficient to prevent deterioration of the catalyst in the second stage by treating the mixture in the second stage until the equilibrium condition of the mixture is reached;
   i. treating the gas stream leaving said second stage in subsequent contact-catalysis stages without admixture of $SO_2$-containing gases; and
   j. said main stream (a) being at a lower temperature than the operating temperature of said second stage, said mixture of step (e) being heated to the inlet temperature of said first contact-catalysis stage by heat-exchanging relationship with the gases emerging from said second stage, and said gases leaving said first stage being cooled to the inlet temperature of said second contact-catalysis stage by mixing with said main stream.

* * * * *